Patented Sept. 28, 1948

2,449,970

UNITED STATES PATENT OFFICE 2,449,970

STABILIZATION OF TERPENE POLYMERS

Joseph N. Borglin, Wilmington, Del., assignor to Hercules Powder Company, Wilmington, Del., a corporation of Delaware No Drawing. Application January 15, 1946, Serial No. 641,419

11 Claims. (Cl. 260—80)

1

This invention relates to solid terpene polymers and, more particularly, to a process of preparing improved solid terpene polymers having an increased stability to decomposition.

The polymerization of terpenes is known to lead to polymers which may range in consistency from viscous, oily products to resinous solids which melt only at elevated temperatures. In the methods of polymerization, which generally have been employed by the art, the polymerization treatment leads to the formation of a solution of the polymer either in added solvent or, in some cases, in residual unpolymerized material. Separation of the polymer from this solution has been effected by distilling off most or all of the more volatile constituents from this mixture, leaving the undistilled polymer as an oil or as a solid at room temperatures. Separation of the polymer from its solution also has been effected by mixing the polymer solution with a miscible organic liquid, which is a nonsolvent for the terpene polymer, in an amount sufficient to precipitate the polymer from solution in a finely-divided state.

The terpene polymers such as those described above have been useful in many applications but have been subject to considerable decomposition on exposure to air or oxygen, resulting in embrittlement and loss in color. Polymerization reduces the unsaturation of the original terpene considerably, rendering the polymer less susceptible to oxidation and discoloration than the original terpene, but sufficient residual unsaturation resides in the polymer to permit on aging, particularly under the influence of heat, a considerable degree of undesired discoloration, embrittlement, and oxidation. These effects take place in the terpene polymer or in a product in which it is used, such as a film-forming composition.

Now, in accordance with this invention, it has been found that the terpene polymers prepared according to prior art processes may be treated with catalytic amounts of iodine to form stabilized terpene polymers which are resistant to oxidation and embrittlement and exhibit satisfactory color retention. The iodine treatment is carried out at elevated temperatures and for a sufficient length of time to result in a substantial decrease in the apparent unsaturation of the polymeric terpene materials.

In the process in accordance with this invention the iodine treatment is applied to those solid terpene resins produced by the polymerization of selected unsaturated carbocyclic terpenes. As an example is the terpene resin composed either wholly or preponderantly of polymers of beta-pinene. The solid terpene polymer may be treated with iodine either by melting the polymer and adding thereto the iodine either in solid form or dissolved in a suitable solvent, or by dissolving the polymer in an inert solvent and adding the iodine to the resulting solution. In either event, the amount of iodine catalyst, the temperature, and the time of heating are so correlated as to result in a marked decrease in the apparent unsaturation of the polymer, as determined by the thiocyanogen value.

Now having generally indicated the nature and purpose of this invention, the following examples will constitute specific illustrations.

*Example I*

Ten parts of a solid, polymerized beta-pinene resin having a thiocyanogen value of 63, an average capillary melting point of 81° C. and a color of 34 Amber on the Lovibond color scale was heated with 0.15 part of solid iodine at 225° C. for 1.5 hours. Upon completion of the iodine treatment, the treated resin had a thiocyanogen value of 23, an average capillary melting point of 67° C. and a color of approximately 55 Amber.

*Example II*

Ten parts of the original resin used in Example I was heated to 150° C. under an atmosphere of carbon dioxide. At this temperature 0.01 part of iodine dissolved in toluene was added. After the toluene had been boiled off, the temperature of the reaction mixture was rapidly raised to 250° C. and maintained at this point for 3 hours. The iodine-treated resin had a thiocyanogen value of 27, an average capillary melting point of 60° C. and a color of 20 Amber.

*Example III*

Ten parts of the original resin used in Example I was melted under an atmosphere of carbon dioxide and 0.001 part of solid iodine added to the melt. The reaction mixture, protected by a blanket of carbon dioxide, was heated at 250° C. for 0.5 hour. The iodine-treated resin had a thiocyanogen value of 37, a capillary melting point of 87° C. and a color of approximately 3.5 Amber.

*Example IV*

Ten parts of the original resin used in Example I was heated with 0.05 part solid iodine at 300° C. for 0.1 hour, utilizing an atmosphere of carbon dioxide. The treated resin had a thiocyanogen value of 33, a capillary melting point of 70° C. and a color of 12 Amber.

Example V

Ten parts of the original resin used in Example I was heated under an atmosphere of carbon dioxide with 0.3 part solid iodine at 225° C. for 3 hours. The iodine-treated resin had a thiocyanogen value of 18 and a capillary melting point of 90° C.

Example VI

The procedure of Example V was followed using an atmosphere of nitrogen, 0.5 part solid iodine and 1.5 hours reaction time. The iodine-treated resin had a thiocyanogen value of 16 and a capillary melting point of 92° C.

Example VII

The procedure of Example V was followed using 0.15 part solid iodine, a temperature of 325° C. and a reaction time of 1.5 hours. The treated resin had a thiocyanogen value of 7 and a capillary melting point of 83° C.

Example VIII

Two hundred parts of dipentene and 63 parts of crude butadiene (50% butadiene) were dissolved in 400 parts of ethylene dichloride. To the resulting solution, at a temperature between −10° C. and −18° C., was added 15 parts of anhydrous aluminum chloride in small portions, the reaction mixture being continuously stirred. Stirring was then continued for 2 hours while maintaining the reaction mixture at about 0° C. To the reaction mixture then was added about 790 parts of anhydrous ethyl alcohol, causing precipitation within the reaction mixture. The precipitate was dissolved in benzene, the resulting solution washed with dilute hydrochloric acid, then water, and the benzene evaporated to give 130 parts of a dipentene-butadiene copolymer having a thiocyanogen value of 35 and an average capillary melting point of 79° C.

Ten parts of this copolymer was heated under an atmosphere of carbon dioxide with 0.15 part solid iodine at 225° C. for 1.5 hours. The iodine-treated copolymer had a thiocyanogen value of 20 and a capillary melting point of 77° C.

Thus, the stable terpene polymers are provided by contacting solid terpene polymers with iodine under conditions adapted to effect substantial decrease in the apparent unsaturation of the polymer, as indicated by the reduction in thiocyanogen value of the polymer. In the examples 0.01% to 5% of iodine, based upon the weight of the terpene polymer, was employed, and this range of iodine constitutes that in which the desired effects of this invention are obtained. However, a preferable iodine range extends from about 0.1% to about 5%, and a highly desirable range from about 0.5% to about 5%. A particularly useful amount of iodine is from about 0.5% to about 1.5%, based upon the weight of the terpene polymer, and the latter amount is quite practical for most purposes. As shown by the examples, the iodine may be added either in the solid state or in solution in a suitable solvent. When solid iodine is added, it is preferable to add it in small amounts at the contemplated reaction temperature while stirring the reaction mixture to effect dispersion. When added in solution, the concentration of iodine in the solvent may be preferably about 5%. The solvent may be hexane, benzene, toluene, gasoline, xylene, other aromatic hydrocarbons, and the like.

In the examples, the catalytic iodine treatment was conducted at a temperature between 200° C. and 325° C. In general, any temperature between about 200° C. and about 350° C. may be employed, although temperatures between about 225° C. and about 300° C. are preferable. The time required for the catalytic treatment may vary within wide limits and will depend upon such factors as the particular terpene polymer being treated, upon the amount of catalyst employed, upon the solvent utilized, and upon the thiocyanogen value desired in the final product. In the examples, the catalytic treatment was conducted over a period of 0.1 hour to 8 hours. Generally, a reaction period of 0.1 hour to 20 hours may be used, although a period of less than about 10 hours is preferable, and a reaction period of about 1 hour to about 5 hours is particularly advantageous. In any event, the reaction period is correlated with the amount of iodine and the temperature to reduce the apparent unsaturation of the terpene polymer to a point where the polymer becomes stable to heat and oxidation.

In some of the examples, nitrogen or carbon dioxide was utilized to prevent oxidation of the polymer during the stabilization treatment with iodine, and, in general, any gas may be so used which will provide an inert atmosphere to blanket the reaction mixture.

Although none of the examples showed the use of a solvent for the polymer during the iodine treatment, this constitutes a desirable modification of the process. Suitable solvents for the terpene polymers, such as hexane, xylene, benzene, toluene, heptane, gasoline, other aromatic hydrocarbons, and the like, may be utilized. When temperatures considerably above the boiling points of the polymer solutions are employed, it may be necessary to use superatmospheric pressures to prevent undue loss of the solvents. By carrying out the reaction in a closed system, loss of solvent is prevented.

The solid terpene resins which are employed in the process of this invention preferably are those which are composed primarily of polymers of beta-pinene. Although the resins may also contain polymers of other polymerizable terpenes, such as alpha-pinene and terpinolene, the melting points and other properties of the resins are so dependent upon the preponderant formation of beta-pinene polymers that the resins may be considered as composed predominantly of beta-pinene polymers. The resins have a capillary melting point of about 50° C. to about 130° C., a color ranging from about I to about WG on the rosin scale, and a thiocyanogen value of about 30 to about 70. They may be prepared by the polymerization of substantially pure beta-pinene, or turpentine to which beta-pinene has been added to obtain a blend having a beta-pinene content of at least about 50%. The polymerization may be carried out using Friedel-Crafts catalysts, such as boron trifluoride, at temperatures between about −100° C. and about 200° C., and the monomeric terpenic material may be dissolved in a solvent, such as heptane or xylene, which is inert to the polymerization catalyst under the conditions of polymerization. In any case, the choice of solvent, catalyst, and reaction temperature is such that a solid resin is obtained.

As shown by Example VIII, however, the solid terpene polymers derived from the polymerization of terpenes with other unsaturated compounds also are operable in accordance with this invention. Example VIII shows the copolymer of dipentene and butadiene, but there also may be used the solid terpene copolymers derived from the reaction of beta-pinene, alpha-pinene, dipentene, etc., with vinyl, vinylidene and allyl halides, cyclopentadiene, 1,3-cyclohexadiene, 1,3-cycloheptadiene and the like, isobutene, 1,3-butadiene, alkyl- and halogen-substituted 1,3-butadienes such as isoprene and chloroprene, coumarone, indene, styrene and alkyl-substituted styrenes. These solid terpene polymers may be prepared under the same conditions as applied to the polymerization of beta-pinene, and generally are derived from the copolymerization of cyclic terpenes with other unsaturated organic compounds containing a —CH=CH— or $CH_2$=C< group.

The products resulting from the iodine treatment are stable, solid, relatively high-melting resins which exhibit some color improvement over the original terpene polymers. Although radical color improvement does not result from practice of this invention, nevertheless the stabilization of the terpene polymers causes them to retain their original color or the slightly improved color resulting from the iodine treatment for longer periods of time than do the untreated polymers. In general, the stabilized terpene polymers of this invention have a capillary melting point between about 50° C. and about 130° C., a decreased thiocyanogen value which may reach a minimum of about 5, and high resistance to oxidation, discoloration, and embrittlement. The reduction in apparent unsaturation, as indicated by the decrease in thiocyanogen value apparently is directly correlated with the decrease in susceptibility of the polymers to oxidation and discoloration.

Due to the complexity of the terpene polymers of this invention, it is not known exactly what takes place when they are treated with catalytic amounts of iodine at elevated temperatures. However, it is believed that the iodine causes a dehydrogenation of the cyclic portions of the terpene polymers in such a manner that the more or less saturated cyclic ring systems are converted into the more stable aromatic ring structures, which may be subjected to reactions characteristic of aromatic compounds, for example, nitration and sulfonation, such reactions not being applicable to the original terpene polymers. Although the total unsaturation of the molecule may not change markedly, nevertheless the apparent unsaturation, as measured by oxygen absorption or bromine number or thiocyanogen values, is reduced. This is due to the fact that aromatic-type ring structures, because of the particular type of double bond unsaturation therein, are not susceptible to ordinary oxidation and do not undergo the bromine or thiocyanogen tests.

The products of this invention, because of their stability, are particularly useful in the manufacture of varnishes, enamels, lacquers, paints, adhesives, and printing inks. They also are useful in blends with other resins and waxes and in the compounding of rubber and adhesives. Being neutral, they are of especial value where resistance to alkali and acid is demanded.

The stabilization of terpene polymers by heating with iodine represents a definite improvement in the art. Prior to this invention, the polymers, due to their instability, were no more advantageous in various uses than other materials which were lower in cost. Through stabilization, however, the polymers become highly desirable and possess the properties of resistance to oxidation, heat, embrittlement, and loss in color, these properties making the terpene polymers advantageous over other materials finding similar uses.

Where in the specification and appended claims melting points are given, it is meant that reference is made to the average capillary melting point. Likewise, relative to the colors given in the examples, reference is made to the color as determined on a layer of 4 mm. thickness.

What I claim and desire to protect by Letters Patent is:

1. The method of stabilizing a solid terpene polymer derived from a polymerizable cyclic terpene which comprises contacting said polymer with about 0.01% to about 5% of iodine, based upon the weight of the polymer, at a temperature between about 200° C. and about 350° C.

2. The method of stabilizing a solid terpene polymer derived from a polymerizable cyclic terpene which comprises contacting said polymer with about 0.1% to about 5% of iodine, based upon the weight of the polymer, at a temperature between about 200° C. and about 350° C.

3. The method of stabilizing a solid terpene polymer derived from a polymerizable cyclic terpene which comprises contacting said polymer with about 0.5% to about 5% of iodine, based upon the weight of the polymer, at a temperature between about 200° C. and about 350° C.

4. The method of stabilizing a solid terpene polymer derived from a polymerizable cyclic terpene which comprises contacting said polymer with about 0.5% to about 1.5% of iodine, based upon the weight of the polymer, at a temperature between about 225° C. and about 300° C.

5. The method of stabilizing a solid terpene polymer derived from a polymerizable cyclic terpene which comprises contacting said polymer with about 0.01% to about 5% of iodine, based upon the weight of the polymer, in an inert atmosphere at a temperature between about 200° C. and about 350° C.

6. The method of stabilizing a solid terpene polymer consisting preponderantly of beta-pinene polymers higher than the dimer and melting between about 50° C. and about 130° C. which comprises contacting said polymer with about 0.01% to about 5% of iodine, based upon the weight of the polymer, at a temperature between about 200° C. and about 350° C.

7. The method of stabilizing a solid terpene polymer consisting preponderantly of beta-pinene polymers higher than the dimer and melting between about 50° C. and about 130° C. which comprises contacting said polymer with about 0.5% to about 1.5% of iodine, based upon the weight of the polymer, at a temperature between about 225° C. and about 300° C.

8. The method of stabilizing a solid terpene polymer derived from the copolymerization of a polymerizable cyclic terpene with an unsaturated organic compound containing the —CH=CH— group, and consisting preponderantly of a solid terpene copolymer which comprises contacting said polymer with about 0.01% to about 5% of iodine, based upon the weight of the polymer, at a temperature between about 200° C. and about 350° C.

9. The method of stabilizing a solid terpene polymer derived from the copolymerization of dipentene with butadiene, and consisting preponderantly of a solid dipentene-butadiene copolymer which comprises contacting said polymer with about 0.5% to about 1.5% of iodine, based upon the weight of the polymer, at a temperature between about 225° C. and about 300° C.

10. A stabilized solid terpene polymer formed by the process comprising contacting a solid terpene polymer with about 0.01% and about 5% of iodine, based upon the weight of the polymer, at a temperature between about 200° C. and about 350° C.

11. The method of stabilizing a solid terpene polymer derived from the copolymerization of a polymerizable cyclic terpene with an unsaturated organic compound containing the $CH_2=C<$ group, and consisting preponderantly of a solid terpene copolymer which comprises contacting said polymer with about 0.01% to about 5% of iodine, based upon the weight of the polymer, at a temperature between about 200° C. and about 350° C.

JOSEPH N. BORGLIN.

REFERENCES CITED

The following references are of record in the file of this patent:

UNITED STATES PATENTS

| Number | Name | Date |
|---|---|---|
| 2,265,161 | Hasselstrom | Dec. 9, 1941 |
| 2,299,577 | Hasselstrom | Oct. 20, 1942 |

OTHER REFERENCES

Heusler: "Chemistry of the Terpenes" (Pond Translation), 1902, page 37.